Figure 1:
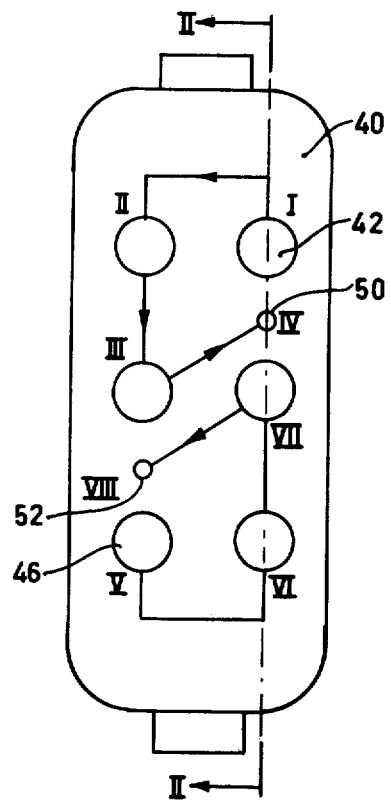

United States Patent [19]

Roelevink et al.

[11] 4,208,700
[45] Jun. 17, 1980

[54] FLASHBULB UNIT

[75] Inventors: Bauke J. Roelevink; Johannes R. Gelens, both of Terneuzen, Netherlands

[73] Assignee: U.S. Philips Corporation, New York, N.Y.

[21] Appl. No.: 882,270

[22] Filed: Feb. 28, 1978

[30] Foreign Application Priority Data

Apr. 4, 1977 [NL] Netherlands ............... 7703634

[51] Int. Cl.² ........................................... G03B 15/02
[52] U.S. Cl. ............................... 362/10; 362/13; 362/251; 362/240; 362/367
[58] Field of Search ............ 362/11, 13, 10, 240, 362/251, 367

[56] References Cited

U.S. PATENT DOCUMENTS

| 4,074,121 | 2/1978 | Jagers et al. | 362/13 |
| 4,087,849 | 5/1978 | Colville et al. | 362/13 |

Primary Examiner—Stephen J. Lechert, Jr.
Attorney, Agent, or Firm—Robert S. Smith

[57] ABSTRACT

A flashbulb unit comprising a housing, a plate-shaped support in the housing and an electrical circuit which is provided on the support and in which flashbulbs and break switches are incorporated. The unit comprises pushbuttons which are incorporated in a wall of the housing and which are arranged each opposite to a break switch and operate the break switch when being depressed.

7 Claims, 6 Drawing Figures

U.S. Patent    Jun. 17, 1980    4,208,700

FLASHBULB UNIT

The invention relates to a flashbulb unit comprising a housing, a plate-shaped support in the housing and an electrical circuit which is provided on the support and in which flashbulbs and break switches are incorporated. Such a flashbulb unit is known from Netherlands patent application No. 7507857.

In the known flashbulb units, the break switches are each situated opposite to a flashbulb and consist of a conductive foil of a low-melting-point metal which is provided across a hole in the support and is secured to a track of the electrical circuit on either side of the hole. The break switches serve to prepare, after flashing the oppositely located flashbulb, a following flashbulb for flashing. The foil melts under the influence of the heat of the flashbulb so that an initial short-circuit of a part of the circuit is removed. The wall of the housing which is situated on the side of the support remote from the flashbulbs has apertures which are located opposite to the break switches. It is possible to manually operate the break switches by means of a slim object, for example a match, via said apertures. This is necessary, for example, when it is desired to flash two or more flashbulbs simultaneously so as to increase the luminous flux. The manual operation of a break switch may also be desired when a bulb fails for some reason or another and it is necessary to switch to a subsequent lamp.

It is the object of the invention to provide a flashlamp unit which is constructed so that break switches in the electric circuit can be operated manually without the photographer having a slim object available.

In agreement herewith the invention relates to a flashbulb unit of the kind mentioned in the preamble which is characterized in that a wall of the housing has pushbuttons which are each arranged opposite to a break switch and operate the break switch when being depressed.

An advantage of the flashbulb unit according to the invention is that a break switch in the electric circuit can be operated efficaciously and easily.

In certain embodiments of the flashbulb unit, for example when comparatively small break switches with respect to the push buttons are used, the push buttons have a cam which is directed towards the oppositely located break switch. Such a cam may be a hollow or solid pin.

An embodiment of the flashbulb unit is characterized in that the pushbuttons are situated below the outer surface of the wall. An advantage hereof is that the pushbuttons are protected against undesired depression.

A preferred embodiment of the flashbulb unit is characterized in that the pushbuttons are formed integral with the wall and are in the form of weaker, depressible locations. An advantage of this construction is that both the wall of the housing and the pushbuttons can be manufactured in one operational step, for example in an injection moulding process.

The weaker depressible locations may be formed as locations of smaller thickness. Preferably use is made of a housing having walls of a thermoplastic synthetic resin, for example polystyrene, polymethacrylate or polycarbonate. For reasons of rigidity, the walls generally have a thickness of 0,6 to 1 mm, as a rule 0.8 mm. The thickness at the area of the push buttons constructed as weaker locations generally is 0.3 to 0.5 mm.

Again another preferred embodiment of the flashbulb unit is characterized in that the weaker locations are in the form of a disk and are bulged. An advantage of this construction is that the pushbutton can be given such resilient properties that the force path diagram shows a non-linear part. Upon operation of such a pushbutton, dependent on the shape of the diagram, either a clicking sound occurs, or the pushbutton remains in the depressed position. Both effects indicate that the break switch has been operated.

Still another embodiment of the flashbulb unit is characterized in that cams are provided along the circumference of the weaker locations so as to keep the wall of the housing at a distance from the support. These cams prevent the break switches from being operated if the unit should be deformed (inadvertently).

The break switches arranged opposite to the pushbuttons may consist of a foil which is guided across an aperture in the support and is secured to a track on either side of the aperture. When a pushbutton is depressed the foil is broken. The break switches may also be formed as a part of a conductive track of the electric circuit which is guided across a weak location in the support. When a pushbutton is depressed, such a weak location is destroyed with simultaneous interruption of the track part guided across said location.

The break switches which can be operated by the pushbuttons, may also serve as radiation-sensitive switches which are destroyed when the oppositely located flashbulb is flashed. The break switches may also serve as fuse switches which fuse upon the passage of current.

Figure 2:
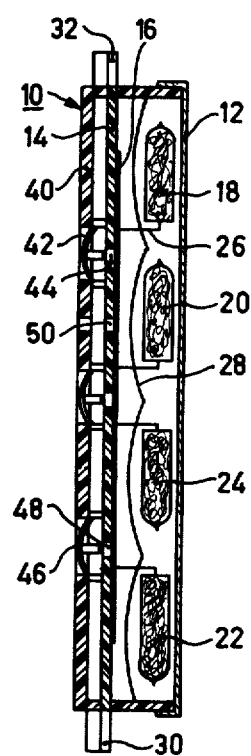
Figure 3:
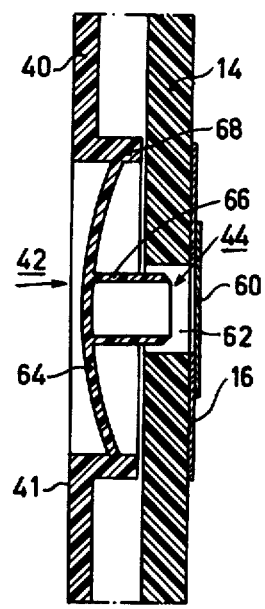
Figure 4:
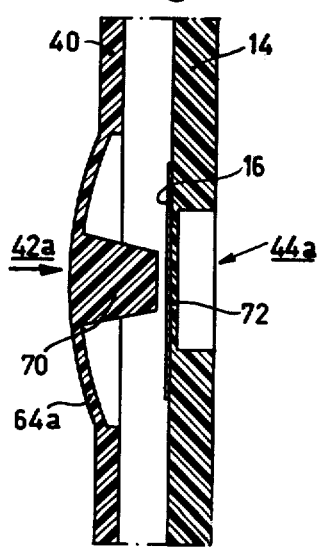
Figure 5:
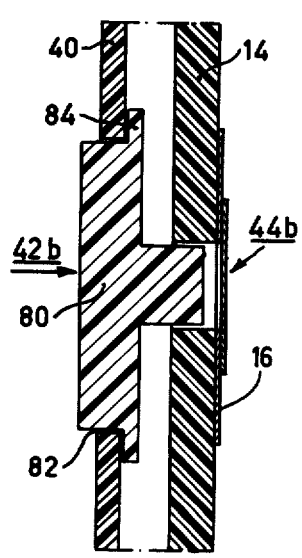
Figure 6:
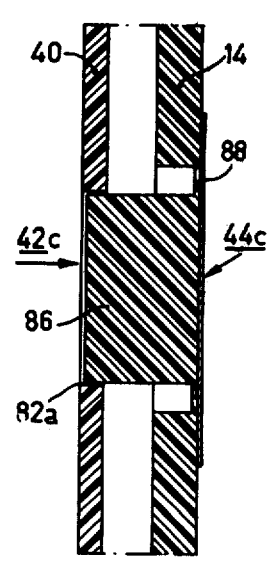

The invention will be described in greater detail with reference to the drawing, in which:

FIG. 1 is a rear view of an embodiment of the flash bulb unit according to the invention, FIG. 2 is a longitudinal sectional view taken on the line II—II of the flashbulb unit shown in FIG. 1, FIG. 3 is a large-scale sectional view of a pushbutton as well as a part of the housing and the support of the flashbulb unit shown in FIG. 2, FIG. 4 is a modified embodiment of the pushbutton shown in FIG. 3, and FIGS. 5 and 6 are sectional views of a detail of another embodiment of a unit according to the invention.

The flashbulb unit shown in FIGS. 1 and 2 has a plastics housing 10 of polystyrene which is closed by a transparent cover 12. Present in the housing 10 is a plateshaped support 14 of polyvinyl chloride on which an electric circuit 16 is printed, of which only a few tracks are shown, to which a first and a second group of high voltage flash-bulbs are connected. Each group comprises four bulbs. Reference numerals 18 and 20 denote flashbulbs of the first group and reference numerals 22 and 24 denote flashbulbs of the second group. The lamp terminals 26 are connected mechanically to the support 14 and are connected electrically to a track of the circuit 16. Reflectors 28 are located between the support 14 and the flashbulbs. The support 14 comprises two connection members 30 and 32 which can be arranged in a fitting aperture of a photocamera.

By means of a piezo element arranged in the camera, a voltage pulse can be applied to the electric circuit 16 on the support 14 via a connection member 30 or 32. The circuit 16 is such that when a pulse is applied to the circuit via the connection member 30 a flashbulb of the first group of high voltage flashbulbs is flashed. When a bulb is flashed, a radiation-sensitive switch (not shown)

which is incorporated in the circuit 16 and which initially formed a conductive connection is interrupted. As a result of this, a shortcircuit of the circuit of a next bulb is interrupted. After flashing the flashbulbs of the first group, the unit is turned up and placed on the camera with the connection member 32, after which the flashbulbs of the second group can be flashed.

The housing 10 has a rear wall 40 situated on the side of the support 14 remote from the flashbulbs and comprising two groups of pushbuttons. The first group comprises three pushbuttons which are referenced 42 and cooperate with the oppositely located break switches 44 which are incorporated in the part of the electric circuit to which the flashbulbs 18 and 20 are connected. The three pushbuttons of the second group are referenced 46 and cooperate with the break switches 48 which are incorporated in the part of the circuit to which the flashbulbs 22 and 24 are connected.

The break switches 44 and 48 comprise an electrical conductor which may be an electrically conductive foil or a part of the track of the circuit. When a pushbutton is depressed, the electrical conductor of the opposite break switch is interrupted and a subsequent flashbulb is prepared for flashing. For example, in order to increase the light flux, the first two flashbulbs of the first group of high voltage flashbulbs can be ignited simultaneously by one voltage pulse by depressing, prior to flashing, the pushbutton 42 denoted by I. When it is desired to flash three or four bulbs simultaneously, the pushbuttons I and II, and I, II and III, respectively, are depressed. The flash sequence of the flashbulbs is shown on the outside of the wall 40 by means of arrows.

The flashbulb unit according to this embodiment comprises furthermore two indicators 50 and 52 with which it can be made visible that all flashbulbs of the first and the second group of high voltage flashbulbs, respectively, have been flashed.

FIG. 3 shows on an enlarged scale a part of the wall 40 comprising a pushbutton 42 according to the invention and a part of the support 14. The support 14 which is 1.5 mm thick comprises a break switch 44 which consists of a foil 60 which is guided over an aperture 62 in the support and is soldered on either side of the aperture 62 to a track of the circuit 16. The pushbutton 42 forms part of the wall 40 which is approximately 0.8 mm thick. The pushbutton is formed as a dish-shaped weaker location 64 which is bulged and is 0.4 mm thick and has a diameter of 10 mm. The spring characteristic of the location 64 is such that when the pushbutton is operated a clicking sound is heard. The force necessary to depress the pushbutton is approximately 2 kgf. The pushbutton 42 is situated below the outer surface 41 of the wall 40 and has on its inside a moulded hollow pin 66 which operates the break switch 44 and interrupts the conductive foil 60 when the pushbutton is depressed. Moulded cams 68 which bear against the support 14 are situated around the location 64.

FIG. 4 shows a modified embodiment of the pushbutton 42 of FIG. 3. This pushbutton 42a also forms one assembly with the wall 40. The weaker location 64a in this embodiment projects beyond the wall 40 and has a moulded conical cam 70 on its inside which operates the break switch 44a when the pushbutton 42a is depressed. The break switch 44a is formed as a part of a conductive track of the electric circuit 16 which is guided over a location 72 of smaller thickness in the support 16.

The pushbutton 42b shown in FIG. 5 comprises an element 80 which is situated in an aperture 82 in the wall 40. By incorporating the element 80 in the aperture 82 so as to be slightly clamping, the pushbutton 42b in normal circumstances is held in its place and is moved inwardly when it is depressed. The pushbutton 42b is locked against dropping out by a flange 84.

FIG. 6 shows still another pushbutton 42c. In this embodiment the pushbutton 42c comprises a cam 86 which forms one assembly with a weaker location 88 of the support 14 and projects through an aperture 82a in the wall 40. When the pushbutton 42c is depressed, the cam 86 is forced out of the support 14 and simultaneously interrupts the electrical conductor of the break switch 44b guided across the cam 86.

Although a flashbulb unit comprising eight flashbulbs has been described, the invention may, of course, also be applied in a flashbulb unit having more or less than eight flashbulbs.

What is claimed is:

1. A flashbulb unit which comprises: a housing, a plate-shaped support disposed in said housing, an electrical circuit which is provided on said support which includes a plurality of flashbulbs and break switches and means for manually preventing electrical power from passing through each of said break switches which comprises a plurality of pushbuttons, each pushbutton cooperating with of one said break switches to physically rupture the cooperating break switch when depressed.

2. A flashbulb unit as claimed in claim 1 wherein said pushbuttons each have a cam which extends toward the cooperating break switch.

3. A flashbulb unit as claimed in claim 1 or 2 wherein said pushbuttons are recessed below the outer surface of said unit.

4. A flashbulb unit as claimed in claim 1 wherein each pushbutton is formed integral with a wall of said unit and are weaker depressible locations within said wall.

5. A flashbulb unit as claimed in claim 4 wherein the weaker locations are disk-shaped and are bulged.

6. A flashbulb unit as claimed in claim 4 or 5 wherein said cams are provided along the circumference of the weaker locations so as to keep said wall spaced from said support.

7. A housing for a flash lamp unit which comprises a wall having a plurality of weaker depressible locations formed integral with the wall and which are disk-shaped and bulged.

* * * * *